United States Patent

Parks

[11] 3,887,854
[45] June 3, 1975

[54] MULTI-SPEED MOTOR

[75] Inventor: Walter K. Parks, Springfield, Mo.

[73] Assignee: General Electric Company, Fort Wayne, Ind.

[22] Filed: Dec. 3, 1973

[21] Appl. No.: 420,981

[52] U.S. Cl. ............ 318/224 A; 318/222; 310/185; 310/198
[51] Int. Cl. .......................................... H02k 17/08
[58] Field of Search ..................... 310/185–207; 318/220–224, 224 A

[56] References Cited
UNITED STATES PATENTS

| | | | |
|---|---|---|---|
| 2,454,136 | 11/1948 | Carville | 318/224 A |
| 2,941,138 | 6/1960 | Ramey | 318/220 |
| 3,153,184 | 10/1964 | Stout | 318/224 |
| 3,270,264 | 8/1966 | Miner | 318/223 |
| 3,359,476 | 12/1967 | Charlton | 318/224 A |
| 3,633,056 | 1/1972 | Hoffmeyer | 310/185 X |

*Primary Examiner*—Donovan F. Duggan
*Attorney, Agent, or Firm*—Ralph E. Krisher, Jr.

[57] ABSTRACT

Auxiliary and main windings are disposed in core slots. Auxiliary winding has a tap about midway therein to allow the optional connection of only a portion thereof. Windings define a number of salient poles; at least two adjacent auxiliary winding salient poles are separated by a distance greater than the separation between other salient poles of such winding. With these provisions the exemplary motor may be operated with its entire auxiliary winding connected through a capacitor in parallel with one or the other of the main windings to provide two speed operation and with only a part connected in series with the capacitor across one of the main windings to provide a third intermediate speed of operation.

10 Claims, 5 Drawing Figures

3,887,854

SHEET 1

3,887,854

MULTI-SPEED MOTOR

BACKGROUND OF THE INVENTION

The present invention relates generally to single phase multi-speed induction motors and, more particularly, to an improved and simplified winding arrangement for multi-speed motors.

Motors designed for operation at two or more different speeds are known in various forms and generally have a main winding that establishes a first given number of poles and an auxiliary winding that establishes the same first given number of poles for operation at a first given speed. Usually the windings are arranged so that, upon actuation of switch means, the main and auxiliary windings each establish a same second given number of poles for operation at a second given speed.

There have been numerous attempts to simplify the construction of such multiple speed motors by, for example, rearranging the interconnection of the individual pole windings or coil groups. One approach for doing this is taught in commonly owned Stout U.S. Pat. No. 3,153,184. It is possible to energize four wound poles as alternating north and south salient poles or to energize those same four wound poles simultaneously at the same instantaneous magnetic polarity thereby providing four induced or consequent poles and a resulting eight pole operation for either the main winding or the start winding or in some instances for both main and start windings. The interpole connections for this type of approach are, of course, rather complicated.

Another approach, sometimes used in induction motors of the type employing a centrifugal switch to disconnect the start winding when the machine achieves its running speed, is to start the motor in its high speed configuration, cut out the start winding when the motor achieves its lower operating speed, and thereafter allow the motor to run solely on the low speed main winding. Numerous other approaches have involved selectively cutting out a portion of the main or start winding to achieve different speeds.

It is one object of the present invention to provide an improved stator for use in a multi-speed electric motor.

Another object of the present invention is to provide a multi-speed motor having a shared start winding.

A more specific object of the present invention is to provide a multi-speed motor wherein a start winding having a first given number of poles is used in conjunction with main windings arranged to operate with the same given number of poles or with a multiple of the same given number of poles.

A further object of the present invention is to provide a multi-speed motor having a very quiet low output low speed mode of operation.

Yet another object of the present invention is to provide an improved multi-speed motor stator which permits economies in its manufacture both in switching arrangements and in terms of windings.

A still further object of the present invention is to provide an improved winding arrangement for a multi-speed motor having two distinct main windings and three speed capability.

Another object of the present invention is to provide a pole changing permanent-split capacitor motor having but a single start winding and therefore but a single capacitor.

Still another object of the present invention is to provide a stator having two main windings defining a dissimilar number of running poles and having but a single start winding in a configuration that provides sufficient starting torque in conjunction with either main winding.

SUMMARY OF THE INVENTION

The foregoing as well as other objects and advantages are achieved, in one form, by providing a single phase motor for operation selectively at a number of different speeds. Such motor comprises a slotted magnetic core having main windings that include one or more coils per pole (with one or more turns per coil) disposed in some of the core slots. The motor also includes means associated with the main windings for selectively operating the main windings in one of several pole number configurations, thereby permitting more than one operating speed. An auxiliary (e.g., start) winding having a predeterminable pole number configuration is also disposed in at least some of the core slots and is energizable in conjunction with the main winding means to provide a starting torque for the motor when the particular pole number configuration of the main winding means is either the same or different than that of the auxiliary winding. The auxiliary winding defines a number of polar axes, at least two adjacent ones of which are separated by a distance greater than the separation between other polar axes of the start winding. The auxiliary winding may be provided with a center tap to allow only alternate auxiliary winding poles to be energized at the same instantaneous magnetic polarity thereby inducing a like number of poles for operation at yet another speed.

In one exemplary embodiment a pole changing permanent split capacitor motor is provided with a stator core having a rotor accepting bore and a plurality of radially extending winding accepting slots. The motor also includes an induction type rotor such as a squirrel-cage rotor rotatably supported within the stator bore. First and second main windings operable to provide dissimilar numbers of magnetic poles are disposed in at least some of the core slots, and an auxiliary winding is also disposed in at least some of the slots and is operable in a first configuration to provide a first number of poles of alternating instantaneous magnetic polarity, and in a second configuration to provide a lesser number of poles of the same instantaneous magnetic polarity.

The subject matter which I regard as my invention is particularly pointed out distinctly claimed in the concluding portion of this specification. My invention itself however together with further objects and advantages thereof may best be understood by reference to the following description taken in conjunction with the accompanying drawing.

DESCRIPTION OF THE PREFERRED EMBODIMENTS

Figure 1:
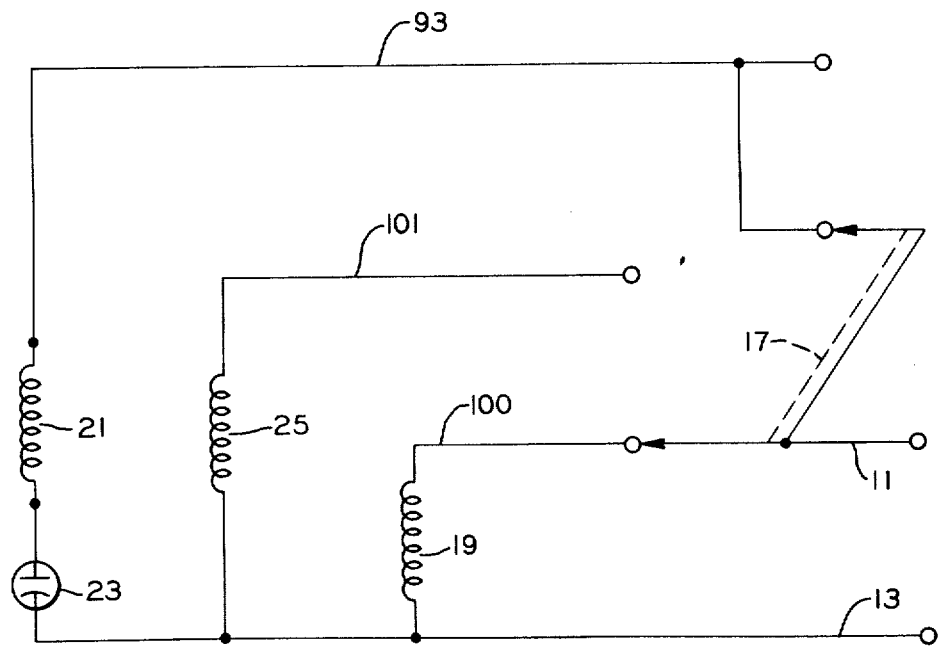
FIG. 1 is a schematic circuit diagram showing the connection of several stator windings to a source of alternating current.

Referring now to the drawings in greater detail, in FIG. 1, conductor lines 11 and 13 are adapted for being connected to any suitable source of alternating current. Line 11 is connected to a double pole-single throw switch 17 which in the position illustrated connects a main winding 19 directly to the source of alternating current and also connects a start winding 21 (which is in series with a capacitor 23) in parallel with the main winding 19 across the source of alternating current. If switch 17 is moved to the alternate position from that illustrated, the start winding 21 and capacitor 23 is still connected to the source of alternating current. However, a main winding 25 then is energized rather than the main winding 19. Contrary to a later described embodiment, the switch 17 could of course be a single pole-single throw switch. The positioning of the start winding 21 relative to the main winding 25 is illustrated in FIG. 2.

Figure 2:
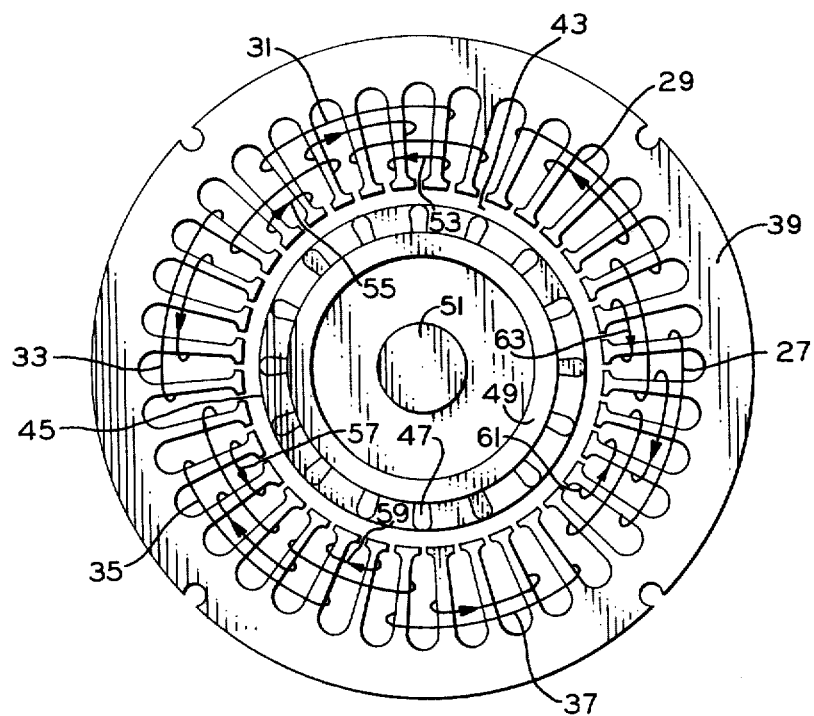
FIG. 2 is a schematic end view of a single phase motor having a six-pole configuration.

In FIG. 2, the main winding (denoted by numeral 25 in FIG. 1) comprises six poles or coil groups equidistantly located about the stator as would be typical of most any six-pole motor. These six main winding coil groups are indicated by reference numerals 27, 29, 31, 33, 35 and 37. The several coil groups 27 through 37 are connected in series with interpole connections so that current flows in alternate ones to provide alternating north and south poles about the stator. The direction of current flow at a given instant is illustrated by the several arrowheads further emphasizing the alternate north-south pole series connection of this main winding 25. The motor illustrated in FIG. 2 includes a typical magnetic stator core 39 (with winding accepting slots 41 and a rotor accepting bore 43) which may be laminated. The illustrated motor also includes an induction type rotor 45 rotatably supported within the stator bore. The rotor may be, for example, of the squirrel-cage type having a laminated magnetic core structure with conductors 47 electrically connected at opposite ends thereof by shorting end rings such as the one shown at 49. Once the rotor 45 has achieved an adequte angular velocity or speed about its axle 51 the motor will continue to run as a six-pole motor as is known in the art.

Such a six-pole motor as known in the art would typically have six equidistantly located starting poles formed by six equidistantly located coil groups within the core slots. Each coil group typically would be located about midway between two adjacent main poles. The stator of FIG. 2 has six auxiliary poles, referred to hereafter as starting poles. However, the coil groups forming these poles are not equidistantly located and are not located midway between two adjacent main poles. The reason for the precise placement of these starting poles will become clear in conjunction with the discussion of FIG. 4. For the moment it is sufficient to recognize that the start winding configuration relative to the six main winding coil groups in FIG. 2 will provide adequate starting torque for the motor for six-pole operation. The several start coil groups identified by reference numerals 53, 55, 57, 59, 61 and 63 are connected in series to form the start winding 21 of FIG. 1. Interpole connections of course are provided to form alternate instantaneous magnetic polarities on adjacent coil groups. In one preferred form, coil groups 53, 57, and 61 are first connected in series to form (for example) a north pole at a given instant of time, while coil groups 55, 59 and 63 are similarly connected in series to form south poles at that same instant of time all as illustrated by the arrowheads on these several coil groups. Thus, the particular directions of current flow illustrated by the arrowheads depict the magnetic condition of the stator at a particular time (bearing in mind that with capacitor 23 in series with the winding 21, the arrowheads on the several start coil groups depict the current flow therein and thus stator magnetic condition at an earlier time—e.g., perhaps as much as 90 electrical degrees earlier—as compared to the condition the arrowheads on the several coil groups of the main winding 25).

Speaking for a moment of the instantaneously established poles associated with each coil group, if coil 35 establishes a north pole and coil 59 establishes a north pole then coil 57 establishes a south pole. This argument, of course, follows for each group of three poles, and thus the combination of main winding 25 and start winding 21 provides a rotating magnetic field which will induce magnetic poles in the rotor 45 and cause the rotor to revolve in a clockwise direction, as viewed in FIG. 2. The effect would, of course, be the same if rotor 45 were a permanent magnet or wound type rotor.

Figure 3:
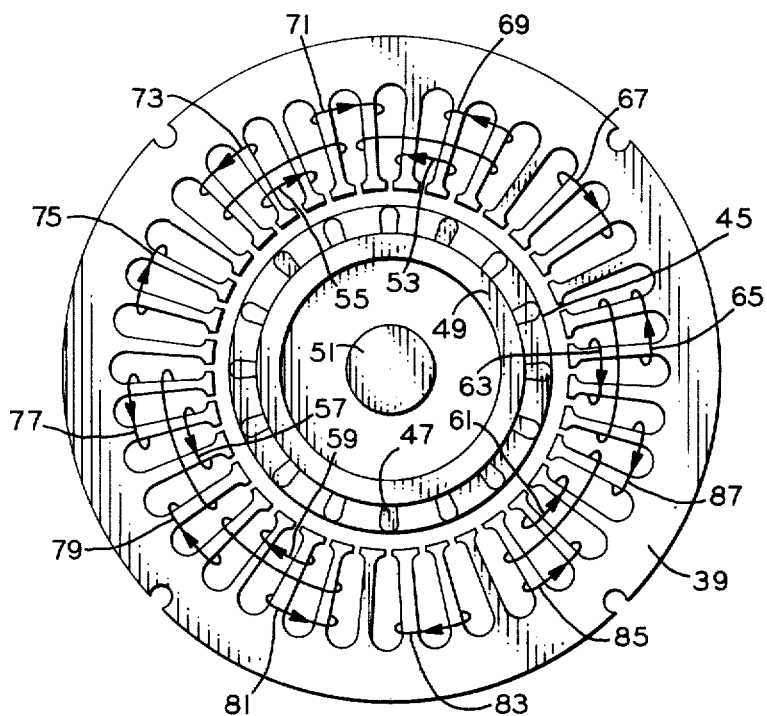
FIG. 3 is a schematic end view of a single phase motor having a 12-pole configuration.

In FIG. 3 the same start coil groups 53–63 are shown in the same positions as in FIG. 2. FIG. 3, however, illustrates the stator 39 as being provided with twelve main or running coil groups which are connected in series and wound to provide alternating north and south poles around the stator. These twelve running coil groups 65, 66, 69, 71, 73, 75, 77, 79, 81, 83, 85 and 87, when connected in series to give the instantaneous magnetic polarities illustrated by their corresponding arrowheads, form the winding 19 of FIG. 1. That the motor of FIG. 3 is also self-starting, is easily seen by again considering the instantaneously established poles associated with the correspondingly numbered coil groups. If coil 79 establishes a north pole at a given instant, coil 57 establishes a south pole while coil 77 will establish a south pole, thus again giving rise to a clockwise rotating magnetic field within the stator and providing a self-starting configuration. A 12-pole configuration such as that illustrated in FIG. 3 has a synchronous speed of 600 rpm. However, typical loading and resulting slip will cause a motor so constructed to have an actual speed of around 500 rpm. Similarly, a six-pole machine represented by FIG. 2 would have a synchronous speed of 1,200 rpm, but loading and resultant slip would cause an actual motor to have a speed of around 1,100 rpm.

The switch 17 of FIG. 1 (when in the lower position thereof shown in FIG. 1) establishes an effective stator winding situation as illustrated in FIG. 3. In this situation, the switch connects line 11 to winding 19 and to conductor 93. If switch 17 is moved to its upper-most position, the stator winding configuration of FIG. 2 results, and line 11 is connected to winding 25 as well as conductor 93. All three windings 19, 21, and 25 are illustrated in their proper relative positions relative to the stator core in FIG. 4. The motor depicted in FIG. 4 will operate precisely as that depicted in FIG. 2 or precisely as that depicted in FIG. 3, depending on the switch position.

Figure 4:
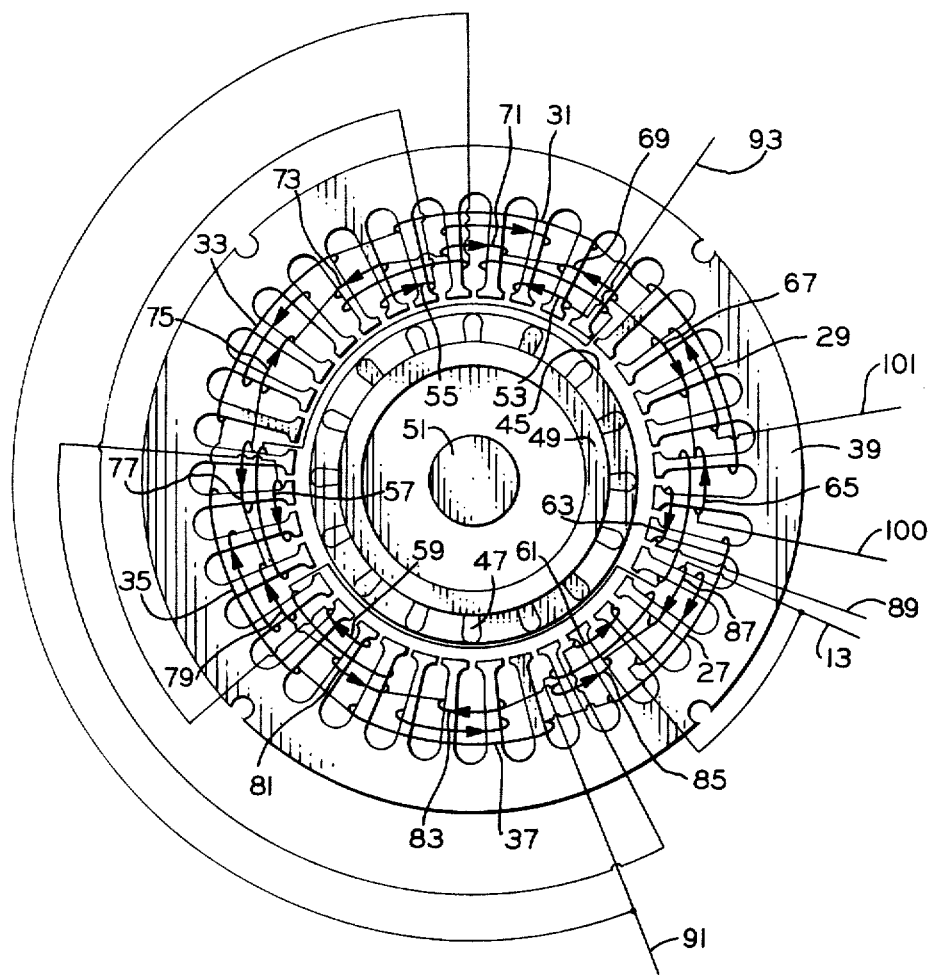
FIG. 4 is a composite of FIGS. 2 and 3 illustrating a schematic end view of a single phase motor adapted to operate selectively on either six or 12 running poles.

FIG. 4 also serves to illustrate that simple equidistant starting poles would not be suitable for both six-pole and 12-pole operation. If a start coil group is positioned midway, for example, between poles 29 and 31 and another starting coil group positioned midway between poles 31 and 33, these two starting poles would need to be of opposite instantaneous magnetic polarity for six-pole operation.

On the other hand, an attempt to use those same two start windings for 12-pole operation would result in opposite magnetic starting poles being adjacent to the two poles 69 and 73 of the 12-pole winding. This would give equal and opposite starting torques at these two points. A similar situation would then also prevail for the remaining poles, and it thus will be understood that a six-pole start winding would give no starting torque in the 12-pole motor if the several coil groups forming the start winding were equidistant.

However, when two adjacent starting poles such as those established by coils 55 and 57 are separated by a distance greater than the separation between other poles of the start winding (such as the poles established by coils 53 and 55), and if all windings are properly relatively positioned as taught herein, a six-pole start winding may be employed for either six- or 12-pole starting and/or running conditions.

Interpole connections are provided for the six- and 12-pole main windings as will be understood. In FIG. 4, the interpole connections for the start winding are illustrated and to illustrate still another feature that can be attained by utilizing the present invention. With reference to FIG. 4, start coils 63, 59 and 55 will establish poles of the same polarity and coils 61, 57 and 53 are energized to establish poles of the opposite magnetic polarity. It will be noted that a tap connection 91 is provided (see FIG. 5 and FIG. 4). This connection lies about midway in the start winding and allows the optional connection of only a portion of the start winding to a source of alternating current. This allows the optional use of only half of the starting coils, e.g., coils 55, 54, and 63. If only half of the starting coils are energized (for example, by supplying current only between the leads 91 and 89) three starting poles of like polarity will be created within the stator and three consequent starting poles will then be induced in the stator. Operation with the three salient start poles and the three induced start poles in conjunction with the six-pole main winding results in a motor speed below that of a motor operating with the configuration of FIG. 2 but above that of the 12-pole configuration illustrated in FIG. 3. Thus providing a third speed of operation for the motor of FIG. 4 may be provided. It should now be understood that the "start" windings just referred to may be energized during running conditions. Thus it will be appreciated that "auxiliary" or "second phase" windings is a more apt term.

Figure 5:
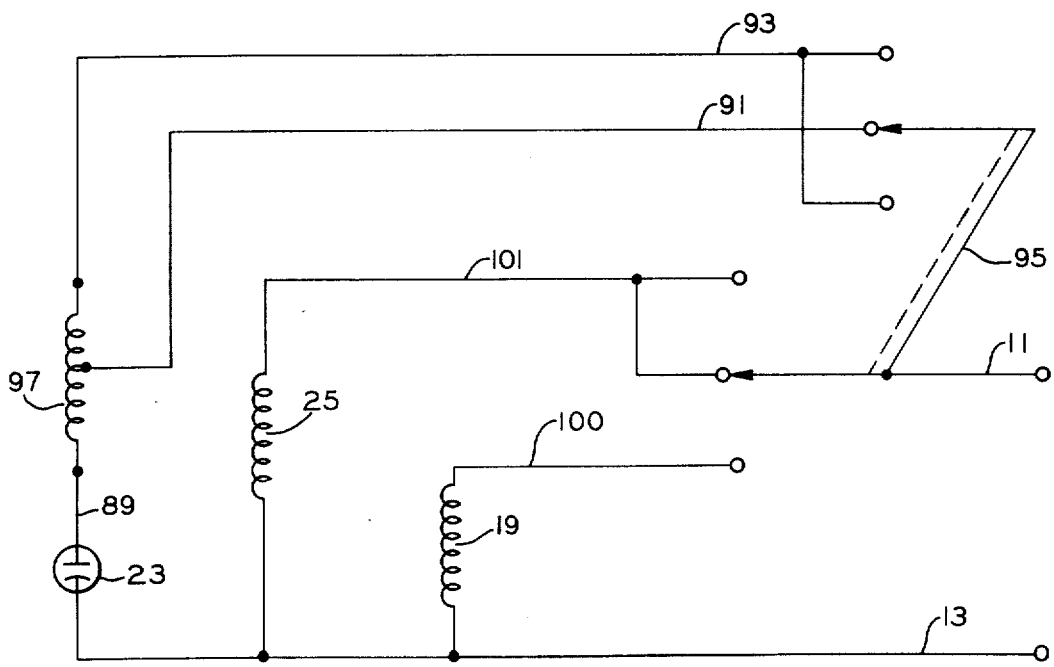
FIG. 5 is a schematic circuit diagram illustrating the connection of the stator windings of the motor of FIG. 4 to a source of alternating current so as to provide three possible operating speeds.

The entire circuit for three speed operation is illustrated in FIG. 5 and employs a double pole-double throw switch 95 which in the position shown gives medium speed operation. FIG. 5 is of course, a modification of FIG. 1 and analogous elements in FIGS. 1 and 5 bear like reference numerals. The only difference between the start winding 97 of FIG. 5 and the similar start winding 21 of FIG. 1 is that the winding 97 is provided with the center connection 91 as illustrated in FIG. 4.

It will be noted that FIGS. 2 and 3 were provided for illustrative purposes only and that interpole connections are not shown therein. However, the interpole connections for those windings are shown in FIG. 4.

The present invention has been described in an illustrative embodiment as a six-pole-12-pole changing motor, however, numerous generalizations are easily seen. If one main winding has $M$ poles and another main winding has $N$ poles with, for example, $M > N$ and if a start winding is provided with $L$ poles a somewhat symmetrical start pole configuration may be devised by selecting $L$ to be the greatest common divisor of $M$ and $N$. While this condition is not required for all possible configurations in accordance with the present invention it does provide those configurations having better starting torques and in particular the condition where $L = N$ provides good starting torques for many environments.

Motors constructed in accordance with the present invention are particularly suited for use in multi-speed fan environments where the startup torque requirements are not particularly stringent and multiple speed operation is highly desirable. The present exemplary embodiment has employed a capacitor that can be permanently connected in series with the start winding (although the capacitor has not been shown in FIG. 4), with the start winding being energized both for starting and for running. However, the invention has clear applicability to other types of single phase induction motors and, for that matter, to other than induction motors. These and numerous other modifications will readily suggest themselves to those of ordinary skill in the art in light of the foregoing specification and, accordingly, the scope of the present invention is to be measured only by that of the appended claims.

What I claim as new and desire to secure by Letters Patent of the United States is:

1. An electric motor for operation selectively at at least two different speeds, a magnetic core having a plurality of winding accepting slots;

first winding means disposed in at least some of the core slots;

means for selectively connecting the main winding means, in one of at least two different pole number configurations to a source of excitation voltage to thereby provide for more than one operating speed;

auxiliary winding means disposed in at least some of the core slots and energizable in conjunction with the main winding means to provide a starting torque for the motor regardless of the particular pole number configuration of the main winding means, the auxiliary winding means comprising a number of coil groups defining the same number of salient polar axes, the auxiliary winding means being arranged on the core so that a first half of the coil groups are uniformly distributed on the core and a second half of the coil groups are uniformly distributed on the core, with at least two mechanically adjacent ones of the coil groups establishing instantaneous poles of opposite polarity and being separated by an arcuate distance greater than the separation between other salient polar axes of the auxiliary winding means.

2. The invention of claim 1 wherein the interconnected coil groups are adapted to be connected to a source of alternating current for both starting and running operation of the motor.

3. The invention of claim 1 wherein the auxiliary winding means comprises a number of interconnected coil groups, each coil group forming at least one magnetic pole during operation, with each one of a pair of electrically adjacent coil groups being mechanically separated from one another by at least one other coil group.

4. The invention of claim 3 wherein there are an even number $L$ of interconnected coil groups in the auxiliary winding means, $L/2$ electrically adjacent coil groups are arranged on the magnetic core to simultaneously provide magnetic poles of a first magnetic polarity, the remaining $L/2$ coil groups are arranged on the magnetic core to simultaneously provide poles of a magnetic polarity opposite to the first magnetic polarity, and the coil groups are mechanically interleaved around the core to provide mechanically adjacent alternate magnetic poles.

5. The invention of claim 1 wherein the first winding means comprises a first even number $N$ of interconnected coil groups, with the $N$ coil groups forming running poles for high speed operation and a second even number $M$ of interconnected coil groups with the $M$ coil groups forming running poles for low speed operation; the auxiliary winding means comprises a third even number $L$ of interconnected coil groups with the $L$ coil groups forming auxiliary poles where $M > N \geq L$; and further comprising means for connecting the $L$ interconnected coil groups across a source of alternating current and means for selectively connecting only one of the $N$ and $M$ coil groups across a source of alternating current for a desired speed of operation.

6. The invention of claim 5 further comprising means for connecting one-half of the $L$ coil groups to a source of alternating current whereby each of the connected one-half coil groups will establish poles of the same instantaneous magnetic polarity so as to provide one-half direct poles and one-half consequent poles, and an intermediate speed of operation.

7. The invention of claim 5 where $L$ is the greatest common divisor of $M$ and $N$.

8. A pole changing electric motor comprising:
a stator core having a rotor accepting bore and a plurality of generally radially extending winding accommodating slots;
a rotor supported for rotation within the stator bore;
a first main winding disposed in at least some of the core slots and operable to provide a number $N$ of magnetic poles when connected to a source of alternating current;
a second main winding disposed in at least some of the core slots and operable to provide a number $M$ of magnetic poles when connected to a source of alternating current, where $M$ is greater than $N$;
an auxiliary winding comprising a number of coil groups disposed in at least some of the core slots and operable to provide at least a number $L$ of auxiliary magnetic poles when connected to a source of alternating current, the auxiliary winding having a tap connection therein to allow the optional connection of a portion only of the auxiliary winding to a source of alternating current to thereby optionally provide at least only $L/2$ auxiliary magnetic poles;
the numbers $M$, $N$, and $L$ being whole numbers with $L = N$;
said first main winding comprising $N$ coil groups, said second main winding comprising $M$ coil groups, and said auxiliary winding comprising $L$ coil groups;
and at least $L/2$ poles being instantaneously of like magnetic polarity whereby $L/2$ consequent auxiliary poles may be established when the tap connection is connected to a source of power.

9. The motor of claim 8 wherein the auxiliary winding is disposed in the core slots to provide a nonuniformly distributed set of $L$ salient auxiliary poles of alternating instantaneous magnetic polarity when the entire auxiliary winding is connected to a source of alternating current.

10. The motor of claim 9 wherein $L$ is the greatest common divisor of $M$ and $N$.

* * * * *